United States Patent
Williams et al.

(10) Patent No.: US 9,793,029 B2
(45) Date of Patent: *Oct. 17, 2017

(54) FLEXIBLE, PRESSURE-BALANCED CABLE ASSEMBLY

(71) Applicant: ITT Manufacturing Enterprises, LLC, Wilmington, DE (US)

(72) Inventors: Roger C. Williams, Santa Rosa, CA (US); Stephen T. Lang, Santa Rosa, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,589

(22) Filed: Jan. 21, 2015

(65) Prior Publication Data
US 2016/0211052 A1    Jul. 21, 2016

(51) Int. Cl.
*H01B 7/18* (2006.01)
*H01B 7/04* (2006.01)
(Continued)

(52) U.S. Cl.
CPC ............ *H01B 7/04* (2013.01); *E21B 17/028* (2013.01); *H01B 13/221* (2013.01); *H02G 1/14* (2013.01); *H02G 15/046* (2013.01); *H02G 15/18* (2013.01); *H02G 1/08* (2013.01); *H02G 15/23* (2013.01); *H02G 15/24* (2013.01)

(58) Field of Classification Search
CPC .... H01G 15/02; H01G 15/08; H01G 15/1806; H01G 15/20; H01G 15/22; H01G 15/32

USPC ............ 174/84 R, 95, 99 R, 19, 21 R, 21 JS, 174/22 R, 23 R
See application file for complete search history.

(56) References Cited

U.S. PATENT DOCUMENTS

| 3,641,479 A | 2/1972 | O'Brien et al. |
| 3,652,777 A | 3/1972 | Elliott |

(Continued)

FOREIGN PATENT DOCUMENTS

| CN | 101976782 | 2/2011 |
| EP | 0 637 675 | 2/1995 |

(Continued)

OTHER PUBLICATIONS

Extended European Search Report in Patent Application No. 16152201.6, dated Jul. 7, 2016 in 9 pages.

*Primary Examiner* — William H Mayo, III
(74) *Attorney, Agent, or Firm* — Knobbe, Martens, Olson & Bear LLP (57) ABSTRACT

Some embodiments include a flexible, pressure-balanced cable assembly. The cable assembly has a tubular-shaped flexible outer sleeve that surrounds an electrical cable. A plurality of seals is positioned along the length of the flexible sleeve within the space formed between the inner surface of the flexible sleeve and the outer surface of the electrical cable. The seals partition the space into a plurality of individual chambers. Each chamber is filled with dielectric fluid. The seals are independently and bi-directionally movable in response to a pressure difference between the inside of the cable assembly and the external environment thereby balancing the pressure between the inside of the cable assembly and the external environment.

21 Claims, 6 Drawing Sheets

(51) Int. Cl.
*H01B 13/22* (2006.01)
*E21B 17/02* (2006.01)
*H02G 1/14* (2006.01)
*H02G 15/04* (2006.01)
*H02G 15/18* (2006.01)
H02G 1/08 (2006.01)
H02G 15/23 (2006.01)
H02G 15/24 (2006.01)

(56) References Cited

U.S. PATENT DOCUMENTS

| | | | |
|---|---|---|---|
| 3,729,699 A | 4/1973 | Briggs et al. | |
| 4,080,025 A | 3/1978 | Garnier et al. | |
| 4,105,279 A | 8/1978 | Glotin et al. | |
| 4,142,770 A | 3/1979 | Butler, Jr. et al. | |
| 4,174,875 A | 11/1979 | Wilson et al. | |
| 4,390,229 A | 6/1983 | Chevalier | |
| 4,488,765 A | 12/1984 | Erbe | |
| 4,500,151 A | 2/1985 | Ayers | |
| 4,500,156 A | 2/1985 | Nguyen | |
| 4,515,426 A | 5/1985 | Bager | |
| 4,561,679 A | 12/1985 | Choate | |
| 4,589,717 A | 5/1986 | Pottier et al. | |
| 4,767,349 A | 8/1988 | Pottier et al. | |
| 4,780,574 A | 10/1988 | Neuroth | |
| 4,797,117 A | 1/1989 | Ayers | |
| 4,859,196 A | 8/1989 | Durando et al. | |
| 4,880,390 A | 11/1989 | Brackmann, Jr. et al. | |
| 4,948,377 A | 8/1990 | Cairns | |
| 5,334,032 A | 8/1994 | Myers et al. | |
| 5,645,442 A | 7/1997 | Cairns | |
| 5,760,334 A | 6/1998 | Ziemek | |
| 5,899,765 A | 5/1999 | Niekrasz et al. | |
| 5,907,128 A * | 5/1999 | Lanan | H01R 4/20 174/74 R |
| 6,200,152 B1 | 3/2001 | Hopper | |
| 6,326,550 B1 * | 12/2001 | Dyer | G02B 6/4428 174/93 |
| 6,559,383 B1 * | 5/2003 | Martin | H01R 35/04 174/21 C |
| 6,780,037 B1 | 8/2004 | Parmeter et al. | |
| 6,796,821 B2 | 9/2004 | Cairns et al. | |
| 6,832,924 B2 | 12/2004 | Maletzki et al. | |
| 6,916,193 B2 | 7/2005 | Varreng et al. | |
| 6,932,636 B2 | 8/2005 | Abbey et al. | |
| 7,112,080 B2 | 9/2006 | Nicholson | |
| 7,367,848 B2 | 5/2008 | John | |
| 7,528,513 B2 | 5/2009 | Oh | |
| 7,533,461 B2 | 5/2009 | Griffiths | |
| 7,695,301 B2 | 4/2010 | Mudge, III et al. | |
| 7,737,361 B2 | 6/2010 | Huspeni et al. | |
| 7,752,918 B2 | 7/2010 | Davis | |
| 7,767,908 B2 | 8/2010 | Sylvan | |
| 7,806,708 B2 | 10/2010 | Erstad | |
| 7,828,573 B2 | 11/2010 | Butaud | |
| 7,955,105 B2 | 6/2011 | Maeland | |
| 7,959,454 B2 | 6/2011 | Ramasubramanian et al. | |
| 8,025,506 B2 | 9/2011 | Cairns | |
| 8,816,196 B2 * | 8/2014 | Williams | E21B 33/04 174/11 R |
| 2002/0046865 A1 * | 4/2002 | Bertini | H01R 4/70 174/84 R |
| 2003/0148638 A1 | 8/2003 | McHugh et al. | |
| 2003/0172743 A1 | 9/2003 | Ao et al. | |
| 2004/0118590 A1 | 6/2004 | Head | |
| 2004/0211586 A1 | 10/2004 | Sinha et al. | |
| 2004/0262025 A1 * | 12/2004 | Brandt | H02G 15/115 174/88 R |
| 2005/0056456 A1 | 3/2005 | Ladie et al. | |
| 2005/0189130 A1 | 9/2005 | Bertini et al. | |
| 2007/0010119 A1 | 1/2007 | Hall et al. | |
| 2007/0040459 A1 | 2/2007 | Oh | |
| 2007/0169954 A1 | 7/2007 | Bertini et al. | |
| 2009/0065237 A1 | 3/2009 | Evoniuk et al. | |
| 2011/0130024 A1 | 6/2011 | Cairns | |
| 2011/0306225 A1 | 12/2011 | Chaize | |
| 2012/0097444 A1 | 4/2012 | Hilberts et al. | |
| 2012/0100738 A1 | 4/2012 | Palinkas et al. | |
| 2013/0183003 A1 * | 7/2013 | Cairns | G02B 6/4428 385/77 |
| 2013/0206474 A1 | 8/2013 | Skrypka et al. | |
| 2013/0312996 A1 | 11/2013 | Nicholson | |
| 2014/0096992 A1 | 4/2014 | Williams et al. | |
| 2014/0097001 A1 | 4/2014 | Campbell et al. | |
| 2014/0099812 A1 | 4/2014 | Burrow et al. | |
| 2015/0111420 A1 | 4/2015 | Zillinger et al. | |
| 2015/0315877 A1 | 11/2015 | Hamilton-Gahart et al. | |

FOREIGN PATENT DOCUMENTS

| | | |
|---|---|---|
| EP | 0 902 505 | 3/1999 |
| EP | 2 386 714 | 11/2001 |
| WO | WO 02/03854 | 12/2002 |
| WO | WO 2008/113026 | 9/2008 |
| WO | WO 2009/097609 | 8/2009 |

* cited by examiner

FLEXIBLE, PRESSURE-BALANCED CABLE ASSEMBLY

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects described herein relate to a pressure-balanced cable assembly that utilizes a tubular-shaped flexible sleeve surrounding an electrical cable. A series of O-ring seals are positioned between an inner surface of the flexible sleeve and an outer surface of the electrical cable and dielectric fluid is distributed between each of the O-rings. Each adjacent pair of O-ring seals delimits and seals an individual chamber containing the dielectric fluid. The O-ring seals are independently and bi-directionally movable along the electrical cable in response to differences in pressure between the environment external to the assembly (e.g., the downhole environment) and pressures within the assembly. The use of multiple O-ring seals provides a high degree of redundancy in the case that one or more of the O-rings fail. The result is an inexpensive, flexible, low-profile pressure-balanced cable assembly that has a high degree of reliability.

Accordingly, in one aspect of the invention, a flexible, pressure-balanced sleeve assembly for a cable termination is provided. The sleeve assembly comprises a flexible outer sleeve surrounding an electrical cable, a plurality of seals positioned between the flexible outer sleeve and the electrical cable, and a plurality of chambers defined between each of the plurality of seals. Dielectric fluid is contained within each of the plurality of chambers. The seals are independently movable along the electrical cable in response to differences between a pressure within a respective chamber and a pressure outside of the respective chamber.

In another aspect of the invention, a flexible, pressure-balanced electrical cable assembly is provided. The cable assembly comprises an electrical cable and a flexible tubing positioned over the electrical cable. The flexible tubing defines a space between an inner surface of the flexible tubing and an outer surface of the electrical cable. A plurality of O-ring seals is positioned between the inner surface of the flexible tubing and the outer surface of the electrical cable where the plurality of O-ring seals partition the space into a plurality of individual chambers. The assembly further comprises dielectric fluid contained within each of the individual chambers. Each of the plurality of O-ring seals is independently movable along the outer surface of the electrical cable in response to differences between a pressure within the electrical cable assembly and a pressure outside of the assembly.

In yet another aspect, a method of pressure-balancing a termination of an electrical cable is provided. The method comprises positioning the electrical cable within a flexible outer sleeve where a space is defined between an outer surface of the electrical cable and an inner surface of the flexible outer sleeve. A plurality of O-ring seals is positioned in the space. Positioning the O-ring seals comprises spacing apart each O-ring seal along a length of the flexible outer sleeve and distributing dielectric fluid between each of the plurality of O-ring seals during the positioning step. Each adjacent pair of O-ring seals delimits and seals an individual chamber containing the dielectric fluid.

BRIEF DESCRIPTION OF SEVERAL VIEWS OF THE DRAWINGS

The present invention is described in detail below with reference to the attached drawing figures, wherein.

DETAILED DESCRIPTION

Aspects herein provide for a flexible, pressure-balanced cable assembly. The assembly comprises a flexible outer sleeve constructed from, for example, a non-electrically conductive plastic that surrounds an electrical cable. The flexible outer sleeve defines a chamber or space between an inner surface of the outer sleeve and an outer surface of the electrical cable. O-ring seals are positioned within the space effectively partitioning the space into a plurality of discrete chambers. Each of the discrete chambers is filled with a dielectric fluid. In response to a pressure differential between the inside of the cable assembly and the external environment (i.e., the environment surrounding the cable assembly), each of the O-rings seals is independently and bi-directionally movable along the electrical cable to effectuate pressure-balancing between the external and the internal environment.

The flexible, pressure-balanced cable assembly thus described provides an economical alternative to traditional pressure-balanced assemblies constructed from multiple metal parts. The outside diameter of the flexible, pressure-balanced cable assembly, moreover, may be configured to be only slightly greater than the diameter of the electrical cable itself. The resulting low-profile of the assembly, combined with the flexible nature of the outer sleeve, makes the assembly easy to manipulate when used in, for example, a downhole oil well environment. Additionally, the use of multiple O-rings seals provides layers of redundancy which, in turn, imparts a high degree of reliability to the flexible, pressure-balanced cable assembly. By using a plastic outer sleeve instead of metal, furthermore, a closer match can be achieved between the thermal expansion rate of the plastic and that of the dielectric fluid and the insulative shield that surrounds the electrical cable. The result is that the O-ring seals do not have to travel as far to accommodate temperature changes in the downhole environment.

As used throughout this disclosure, the term "flexible" when used in the context of the outer sleeve may be defined as the capability to bend easily without comprising the integrity of the outer sleeve. Further, as used throughout this disclosure, the term "cable" may mean a single electrical, or optical, conductor or it may mean two or more separate electrical or optical conductors joined together via, for example, a contact socket or other type of connection. The term "distal" as used throughout this disclosure means further away from a defined midpoint, while the term "proximal" means closer to the defined midpoint.

Figure 1A:
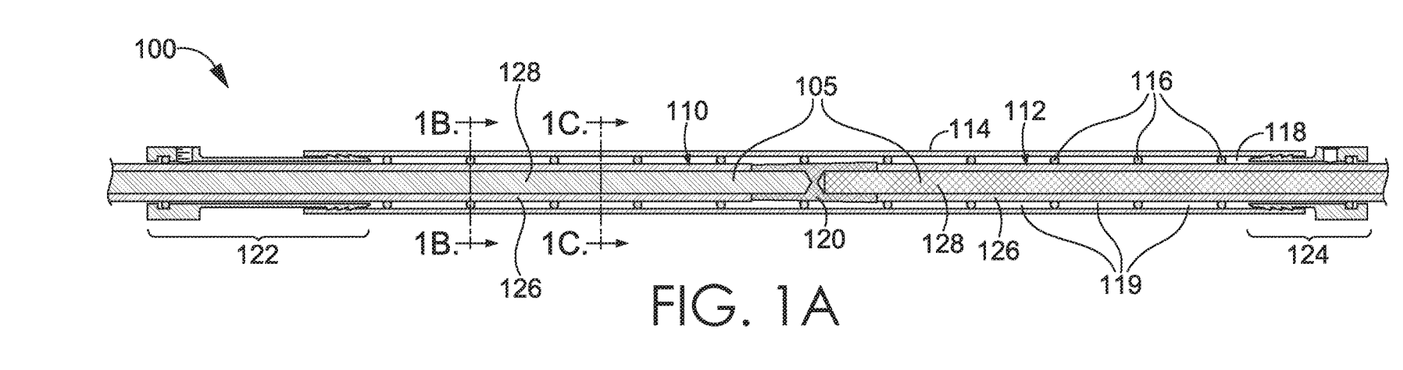
FIG. 1A depicts a cross-sectional view taken along a longitudinal axis of a flexible, pressure-balanced cable assembly in accordance with an aspect herein.

Turning now to FIG. 1A, a cross-sectional view taken along a longitudinal axis of a flexible, pressure-balanced cable assembly 100 is provided. The cable assembly 100 comprises at least an electrical cable 105 (shown as a first conductor 110 and a second conductor 112 connected by a contact socket 120) surrounded by a flexible sleeve 114. Multiple seals 116 are spaced along the length of the flexible sleeve 114 and are disposed in an annular chamber or space 118 created by an inner surface of the tubular-shaped flexible sleeve 114 and an outer surface of the first conductor 110 and the second conductor 112. The annular space 118 is divided into a series of individual chambers 119 by the seals 116 with each individual chamber 119 delimited and sealed by an adjacent pair of the seals 116. Each of the chambers 119 is filled with a dielectric silicone grease or other dielectric fluid. The dielectric fluid helps to protect the electrical cable 105 from the deleterious effects of gases and/or liquids in the downhole environment.

The electrical cable 105 comprising the first conductor 110 and the second conductor 112 may comprise a copper conductor core 128 surrounded by, for instance, an ethylene propylene diene monomer (EPDM) insulative shield 126. The contact socket 120 is configured to receive the terminal end of the conductor 110 and the terminal end of the conductor 112 and to electrically and mechanically couple the two conductors 110 and 112 together. Other ways of mechanically and electrically coupling the two conductors 110 and 112 are contemplated herein.

The tubular-shaped flexible sleeve 114 is constructed from a plastic material such as, for example, perfluroalkoxy (PFA), monofluoroalkoxy (MFA), polytetrafluoroethylene (PTFE), and other similar plastics. The material selected to form the flexible sleeve 114 should generally be rated to a high temperature and have a high dielectric strength such that the material is substantially non-electrically conductive. The sleeve 114 may have an outside diameter in the range of, for example, 13 mm to 19 mm although other diameters are contemplated as being within the scope herein. The thickness of the sleeve 114 (e.g., the difference between the outside diameter and the inside diameter of the flexible sleeve 114) may vary but is generally in the range of 2.00 mm to 3.00 mm. The length of the flexible sleeve 114 may be variable but should generally be such that it extends a predetermined distance along the conductors 110/112 starting from a midpoint of the contact socket 120.

The seals 116 may comprise O-rings formed from, for example, synthetic rubbers or plastics including thermoplastics. The O-rings may be circular-shaped and/or may have other shapes such as a square or a quad-type O-ring seal. The size of the O-rings is dependent on the dimensions associated with the sleeve 114 and the dimensions of the conductors 110/112. In general, the inside diameter of the O-ring should be approximately the same as the outside diameter of the conductors 110/112, and the outside diameter of the O-ring should be approximately the same as the inside diameter of the flexible sleeve 114 so that the O-ring occupies substantially all the space 118 between the outer surface of the conductors 110/112 and the inner surface of the flexible sleeve 114 leaving no gaps. In some aspects, the outside diameter of the O-ring may be slightly greater than the inside diameter of the flexible sleeve 114 so as to form an even more occlusive seal. Alternatively, or in addition to, the inside diameter of the O-ring may be slightly less than the outside diameter of the electrical cable 105.

The number of seals 116 may range from a minimum of 2 up to, for example, 20, with an equal number of seals generally being positioned on either side of the midpoint of the contact socket 120. The number of seals 116 and the amount of space 118 between the outside surface of the electrical cable 105 and the inside surface of the flexible sleeve 114 will determine the number and size of the chambers 119. The number and size of the chambers 119, in turn, will determine the volume of dielectric fluid within the cable assembly 100.

In aspects, the dimensions of the flexible sleeve 114 and the dimensions of the seals 116 may be adjusted so as to maintain a fairly consistent volume of dielectric fluid within the cable assembly 100 in order to achieve adequate protection for the electrical cable 105. For instance, in situations where a low profile and a high amount of flexibility of the cable assembly 100 is desirable, the flexible sleeve 114 may be selected to have an outside diameter that is only slightly greater than the diameter of the electrical cable 105. Assuming the thickness of the sleeve 114 is constant, this reduces the amount of space 118 between the inner surface of the flexible sleeve 114 and the outer surface of the electrical cable 105. To maintain a somewhat consistent volume of dielectric fluid in this situation, the length of the flexible sleeve 114 may be increased and a greater number of seals 116 having a smaller outside diameter may be utilized to create a greater number of chambers 119. Conversely, if the profile characteristics of the cable assembly 100 are not that important and/or if a short length of the flexible sleeve 114 is needed, the flexible sleeve 114 may be selected to have a larger outside diameter. Again assuming the thickness of the flexible sleeve 114 remains the same, there will be a greater amount of space 118 between the inner surface of the flexible sleeve 114 and the outer surface of the electrical cable 105. In this situation, a fewer number of seals 116 having a larger outside diameter may be utilized to create a fewer number of chambers 119 having a larger volume such that the total quantity of dielectric fluid remains the same.

The seals 116 are adapted to be bi-directionally and independently movable along the outer surface of the electrical cable 105 and the inner surface of the flexible sleeve 114 in response to pressure differentials between the interior of the cable assembly 100 and the external environment. More specifically, the inside diameter of the seals 116 is in direct contact with the outer surface of the insulative shield 126 and translates along the surface of the insulative shield 126 in response to the pressure differential. Further, the outside diameter of the seals 116 is in direct contact with the inner surface of the flexible sleeve 114 and translates along inner surface of the flexible sleeve 114 in response to the pressure differential. By having the inner surface of the seals 116 in direct contact with the insulative shield 126 and by having the outer surface of the seals 116 in direct contact with the inner surface of the flexible sleeve 114, a lower overall outside diameter of the cable assembly 100 may be achieved as opposed to pressure-balancing assemblies that rely on multiple, metal machined parts and/or shuttles to achieve pressure balancing.

Figure 1B:
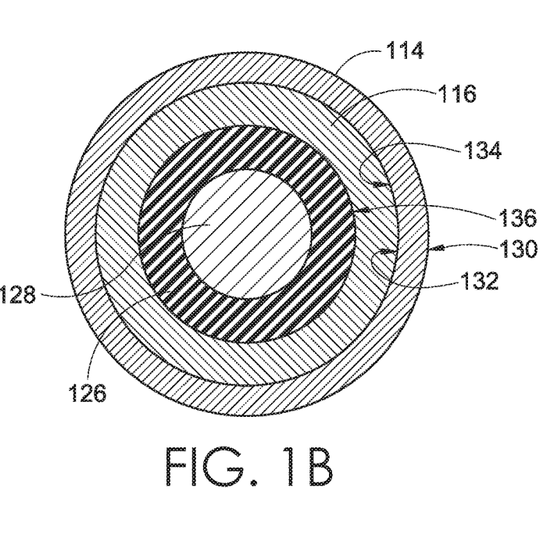
FIGS. 1B-1C depict cross-sectional views taken along line 1B-1B and line 1C-1C of FIG. 1A in accordance with aspects herein.

FIG. 1B depicts a cross-sectional view of the assembly 100 taken along line 1B-1B of FIG. 1A. FIG. 1B depicts the flexible sleeve 114 surrounding the electrical cable 105 comprising the copper conductor core 128 surrounded by the insulative shield 126. The space defined by the inner surface of the flexible sleeve 114 and the outer surface of the insulative shield 126 is occupied by the O-ring seal 116. More specifically, an inner surface of the seal 116 having an inside diameter 136 rests against the outer surface of the insulative shield 126, and the outer surface of the seal 116 having an outside diameter 134 rests against the inner surface of the flexible sleeve 114, where the inner surface has an inside diameter 132. In aspects, the outer diameter 134 of the seal 116 is generally equal to the inside diameter 132 of the sleeve 114. FIG. 1B further depicts the outer surface of the flexible sleeve 114 having an outside diameter 130.

Figure 1C:
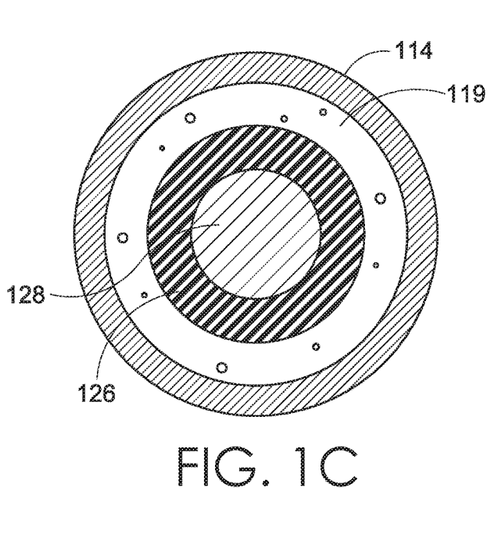

FIG. 1C depicts a cross-sectional view of the cable assembly 100 taken along line 1C-1C of FIG. 1A. This section of the assembly 100 does not contain a seal 116. Instead, as shown in FIG. 1C, a chamber 119 is defined between the inner surface of the flexible sleeve 114 and the outer surface of the insulative shield 126. The chamber 119 is filled with a dielectric fluid as shown by the bubbles in the chamber 119.

Returning to FIG. 1A, the cable assembly 100 may optionally comprise a first fitting 122 and a second fitting 124 disposed at a first end and a second end of the flexible sleeve 114 respectively. The fittings 122 and 124 are not required for the cable assembly 100 to perform its pressure-balancing function but may be useful to facilitate assembly of the cable assembly 100 and/or to mechanically couple the assembly 100 to other equipment as will be explained below.

Figure 2:
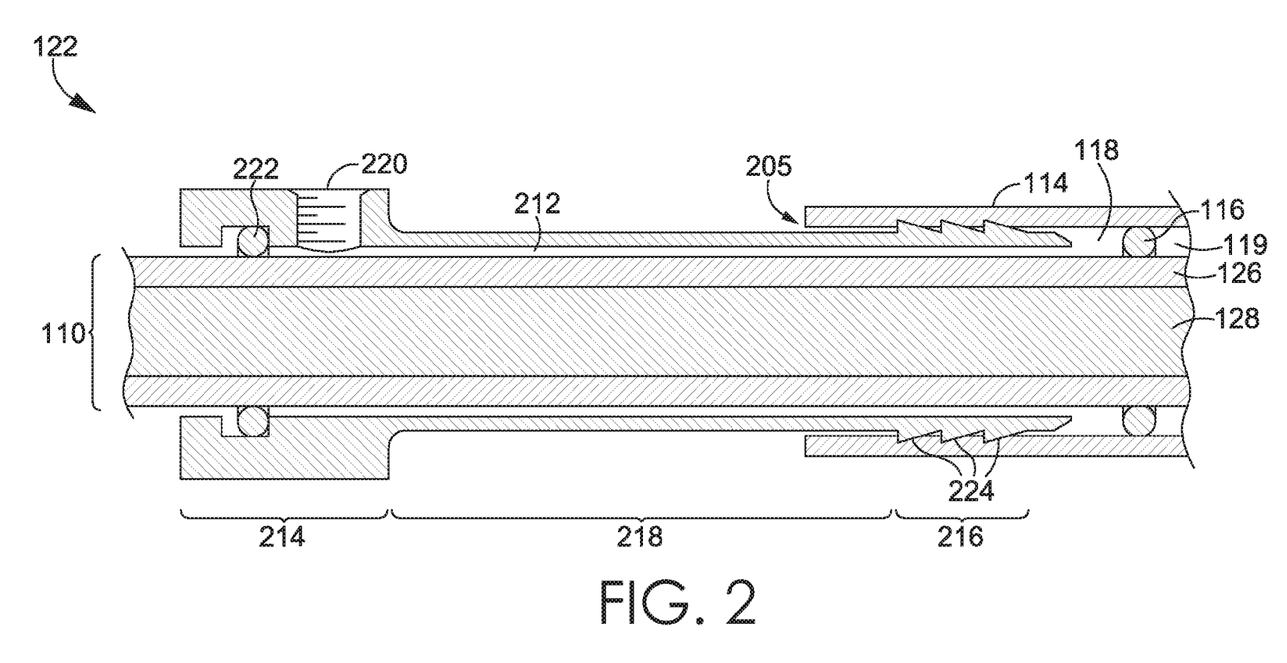
FIG. 2 depicts a cross-sectional view of a first end of a flexible, pressure-balanced cable assembly in accordance with an aspect herein.

FIG. 2 depicts a close-up cross-sectional view of the first fitting 122 taken along its longitudinal axis in accordance with an aspect herein. The first fitting 122 is tubular shaped and is attached to a first end 205 of the flexible sleeve 114. The first fitting 122 surrounds the first conductor 110, and an annular cavity 212 is formed between the inner surface of the tubular-shaped first fitting 122 and the outer surface of the conductor 110. The annular cavity 212 is in communication with the space 118 created by the inner surface of the flexible sleeve 114, and the outer surface of the conductor 110. The first fitting 122 may be formed from materials comprising metals, plastics, thermoplastics, nylon or any combination thereof.

The first fitting 122 comprises a first portion 214, a second portion 216, and an intervening portion 218 connecting the first portion 214 with the second portion 216. With respect to the first portion 214, the first portion 214 may comprise a threaded fill port 220 that is in communication with the environment external to the cable assembly 100 and the interior of the cable assembly 100. To put it another way, the fill port 220 provides a communication path from the external environment (e.g., the downhole environment) through the fill port 220, into the annular cavity 212 and up to the first seal 116 located in the space 118 between the outer surface of the conductor 110 and the inner surface of the flexible sleeve 114. By having an open fill port 220, any changes in pressure—whether positive or negative—are effectively communicated to the interior of the cable assembly 100 where the change in pressure can be balanced via movement of the seals 116 along the flexible sleeve 114/electrical cable 105. The first seal 116 shown in FIG. 2 prevents any harmful liquids or fluids from the downhole environment from coming into contact with the connection between the first conductor 110 and the second conductor 112 at the contact socket 120. A grease gun may be connected to the fill port 220 and dielectric fluid or grease can be distributed into the space 118 via the fill port 220. This process will be explained in greater depth below with respect to FIGS. 5-7.

The first portion 214 may further comprise a seal 222 located distal to the fill port 220 (i.e., further away from the midpoint of the contact socket 120). The seal 222 may be used to prevent any dielectric fluid inserted via the fill port 220 from escaping the assembly 100. Optionally, the first portion 214 may also be adapted to be attached to other devices used in downhole environments such as, for example, an electric submersible pump (ESP).

The second portion 216 of the first fitting 122 comprises a series of barbs 224 that are adapted to mechanically couple the first fitting 122 to the first end 205 of the flexible sleeve 114 by engaging the inner surface of the flexible sleeve 114. The intervening portion 218 has a smooth outer surface. When assembling the cable assembly 100, the seals 116 may first be loaded onto the intervening portion 218 prior to being positioned along the length of the flexible sleeve 114. To put it another way, the intervening portion 218 may act to retain the seals 116 prior to assembling the cable assembly 100. Thus, the length of the intervening portion 218 may be configurable based on the number of seals 116 to be positioned along the length of the flexible sleeve 114—the greater number of seals 116, the longer the intervening portion 218, and the lesser number of seals 116, the shorter the length of the intervening portion 218.

Figure 4:
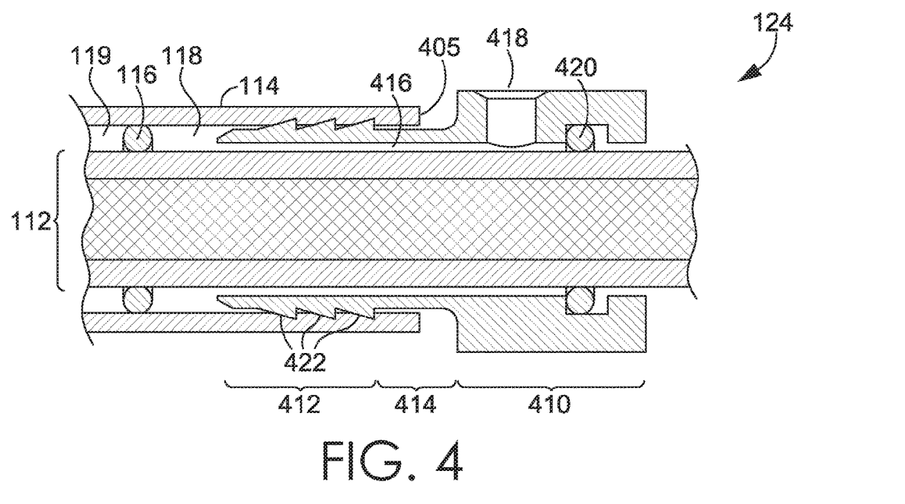
FIG. 4 depicts a cross-sectional view of a second end of a flexible, pressure-balanced cable assembly in accordance with an aspect herein.

FIG. 4 depicts a close-up cross-sectional view of the second fitting 124 taken along its longitudinal axis. The second fitting 124 is tubular shaped and is attached to a second end 405 of the flexible sleeve 114. The second fitting 124 surrounds the second conductor 112, and an annular cavity 416 is formed between the inner surface of the tubular-shaped second fitting 124 and the outer surface of the conductor 112. The annular cavity 416 is in communication with the space 118 created by the inner surface of the flexible sleeve 114 and the outer surface of the conductor 112. The second fitting 124 may be formed from materials comprising metals, plastics, thermoplastics, nylon or any combination thereof.

The second fitting 124 comprises a first portion 410, a second portion 412, and an intervening portion 414 that connects the first portion 410 to the second portion 412. The first portion 410 comprises an open port hole 418 that is in communication with the external environment and the annular cavity 416. Similar to the fill port 220 of the first fitting 122, the port hole 418 acts to convey pressure differences—whether positive or negative—between the external environment and the interior of the cable assembly 100, where the pressure differences are balanced via movement of the seals 116 along the flexible sleeve 114/electrical cable 105. The first seal 116 shown in FIG. 4 helps to prevent harmful liquids or fluids from the downhole environment from coming into contact with the connection between the first conductor 110 and the second conductor 112 at the contact socket 120. The first portion 410 may further comprise a seal 420 located distal (i.e., further away from the midpoint of the contact socket 120) to the port hole 418. The seal 420 acts to prevent loss of dielectric fluid from the assembly 100. Optionally, the first portion 410 may also be adapted to be attached to other devices used in downhole environments.

The second portion 412 of the second fitting 124 comprises a series of barbs 422 that are adapted to mechanically engage with the inner surface of the second end 405 of the flexible sleeve 114. In an exemplary aspect, the length of the intervening portion 414 of the second fitting 124 may be less than that of the intervening portion 218 of the first fitting 122. This is generally because, in an exemplary aspect, the second fitting 124 may not be used to load/retain the seals 116 when assembling the cable assembly 100.

In an exemplary aspect, the cable assembly 100 may optionally comprise a coil spring located at each end of the cable assembly 100 to achieve a slightly higher pressure bias within the assembly 100 as compared to the external environment. By having a slightly higher pressure bias within the assembly 100, a failure of one or more of the seals 116 will cause dielectric fluid to exit the assembly 100 instead of fluids from the downhole environment entering the assembly 100 and potentially causing an electrical short.

In yet another exemplary aspect, the cable assembly 100 may be configured such that the flexible sleeve 114 is positioned over just the electrical cable 110 and a bulkhead pressure block connector is used to connect the electrical cable 112 to the electrical cable 110. This same configuration holds true if the flexible sleeve 114 is positioned over just the electrical cable 112. Any and all such aspects, and any variation thereof, are contemplated as being within the scope herein.

Figure 5:
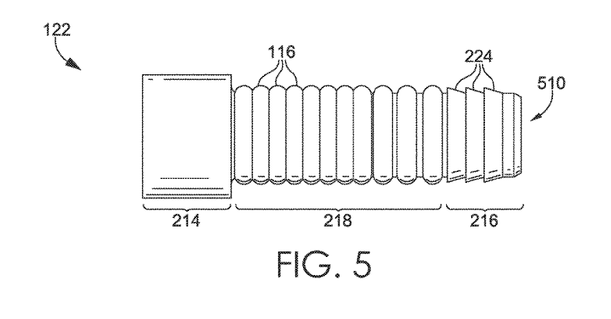
FIG. 5 depicts a side elevation view of a barb fitting used to position O-rings seals in a flexible, pressure-balanced cable assembly in accordance with an aspect herein.
Figure 6:
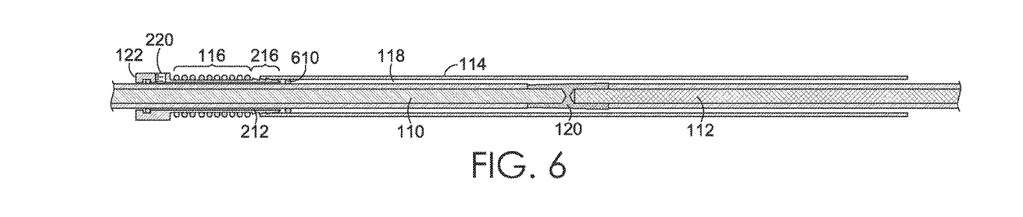
FIG. 6 depicts a cross-sectional view of a flexible, pressure-balanced cable assembly being loaded with O-ring seals in accordance with an aspect herein.

FIGS. 5 and 6 illustrate aspects of how the seals 116 are loaded onto the cable assembly 100 in one exemplary aspect. The loading process may occur off-site (e.g., at a manufacturing site) or on-site (e.g., at the downhole oil well environment). FIG. 5 depicts a side elevation view of the first fitting 122 unaffixed to the flexible sleeve 114 of the cable assembly 100. FIG. 5 illustrates a number of seals 116 loaded on to the intervening portion 218. This may occur by loading the seals 116 onto a terminal end 510 of the second portion 216, sliding them over the barbs 224, and sliding them along the intervening portion 218. The loading of the seals 116 may occur via a manual or an automated process.

FIG. 6 depicts a cross-sectional view of the cable assembly 100 taken along its longitudinal axis after the seals 116 have been loaded on to the first fitting 122 but prior to the seals 116 being positioned along the length of the flexible sleeve 114. In this exemplary view, the first conductor 110 is coupled to the second conductor 112 via the contact socket 120 and the flexible sleeve 114 is positioned over the conductors 110/112 and the contact socket 120 prior to the seals 116 being positioned along the length of the flexible sleeve 114. One exemplary process for positioning the seals 116 along the length of the flexible sleeve 114 comprises unloading a first seal 610 from the second portion 216 of the first fitting 122 by, for example, pulling the first seal 610 over the barbs 224 and positioning the seal 610 at the terminal end 510 of the second portion 216, and then coupling the first fitting 122 to the first end 205 of the flexible sleeve 114 via the barbs 224. Once the first fitting 122 is engaged with the flexible sleeve 114, a grease gun can then be fitted into the fill port 220 and a predefined quantity of dielectric fluid may be inserted into the annular cavity 212. Because of the occlusive seal formed by the first seal 610, distribution of dielectric fluid into the annular cavity 212 acts to move the first seal 610 a predetermined distance in the space 118 created by the inner surface of the flexible sleeve 114 and the outer surface of the electrical cable 105.

Next, the first fitting 122 may be disengaged from the flexible sleeve 114, and a second seal 116 may be moved from the intervening portion 218, over the barbs 224, and on to the terminal end 510. The first fitting 122 is then re-coupled with the flexible sleeve 114 and dielectric grease is again inserted via the fill port 220 until the second seal 116 moves a predetermined distance in the space 118 created by the inner surface of the flexible sleeve 114 and the outer surface of the electrical cable 105. The process is repeated until all of the seals 116 have been positioned along the length of the first conductor 110 and the second conductor 112 and dielectric fluid fills each chamber 119 created by each adjacent pair of seals 116.

In another exemplary loading process, the first conductor 110 may not yet be coupled to the second conductor 112 via the contact socket 120, and the flexible sleeve 114 may be positioned just over the first conductor 110. In this arrangement, the seals 116 may be positioned along a substantial portion of the length of the first conductor 110 using the process set forth above. The contact socket 120 may then be used to couple the first conductor 110 to the second conductor 112. Next, the flexible sleeve 114 may then be slid over the second conductor 112 until the midpoint of the flexible sleeve 114 is generally positioned over the midpoint of the contact socket 120 and an equal number of seals 116 are generally positioned on either side of the midpoint of the contact socket 120.

Figure 8:
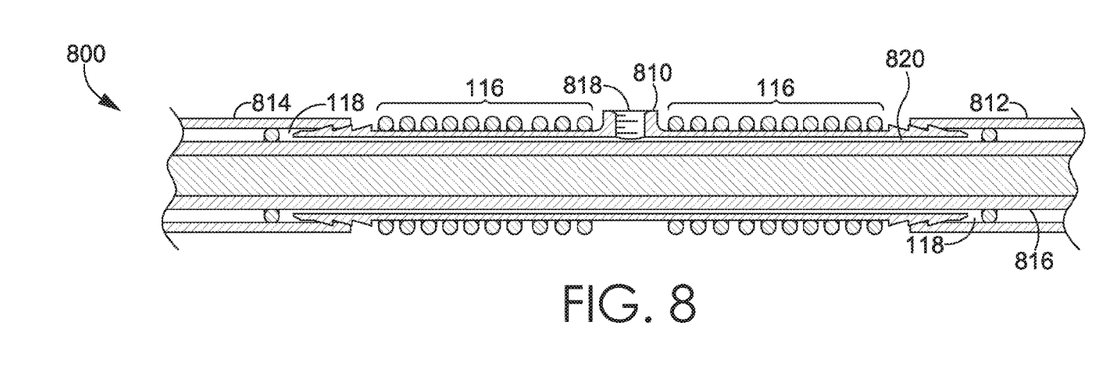
FIG. 8 depicts a cross-sectional view of a T-shaped fitting used to load two flexible, pressure balanced cable assemblies with O-ring seals in accordance with an aspect herein.

Another exemplary arrangement used to load the seals 116 onto the cable assembly is shown in FIG. 8. FIG. 8 depicts a cross-sectional view 800 of a T-shaped fitting 810 taken along its longitudinal axis. The two arms of the tubular-shaped fitting 810 are coupled to a first end of a first flexible sleeve 812 and a first end of a second flexible sleeve 814 by barbs, where both the first and second sleeves 812 and 814 surround an electrical cable 816. A space 820 is created between the inner surface of the fitting 810 and the outer surface of the electrical cable 816; the space 820 is in communication with the space 118 created between the inner surfaces of the sleeves 812 and 814 and the outer surface of the electrical cable 816. The seals 116 may be loaded onto portions of the arms of the fitting 810. The seals 116 may then be simultaneously offloaded from the T-shaped fitting 810 into the space 118 pursuant to dielectric fluid being injected via the fill port 818. The process by which this occurs is similar to that set forth above with respect to, for example, FIG. 6. Any and all such aspects, and any variation thereof, are contemplated as being within the scope herein.

Figure 3:
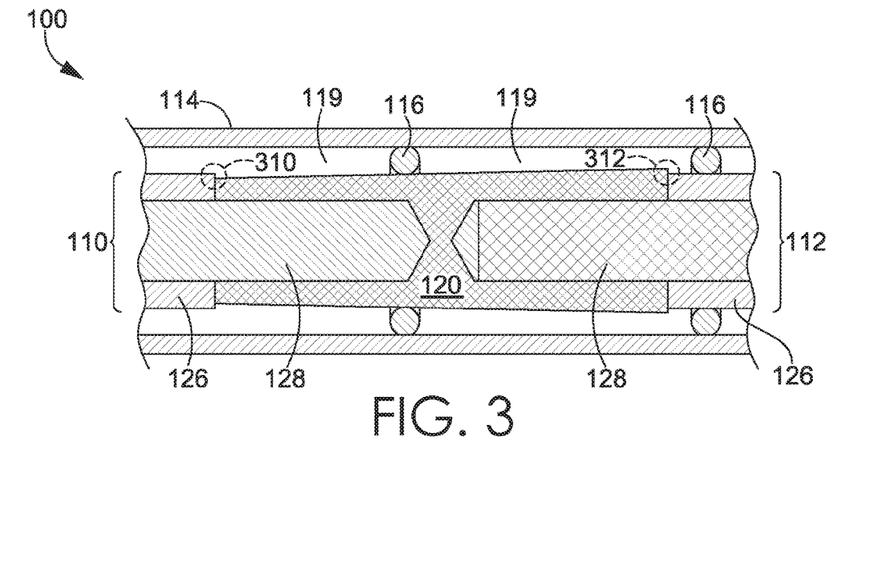
FIG. 3 depicts a cross-sectional view of a middle portion of a flexible, pressure-balanced cable assembly in accordance with an aspect herein.

Returning to, for example, FIG. 6, the contact socket 120 may be configured as is illustrated in FIG. 3 to facilitate a smooth translation of the seals 116 at the connection between the first conductor 110 and the second conductor 112 when positioning the seals 116 along the length of the flexible sleeve 114. FIG. 3 is a close-up view of the contact socket 120 and illustrates the first conductor 110 with its insulative shield 126 and also its copper core 128 extending towards the midpoint of the contact socket 120. Likewise, FIG. 3 further illustrates the second conductor 112 with its insulative shield 126 and also its copper core 128 extending towards the midpoint of the contact socket 120. As shown at reference numeral 130, the contact socket 120 is configured such that a drop-off is created at the junction of the termination of the insulative shield 126 of the first conductor 110 and the contact socket 120. In other words, the outside diameter of the contact socket 120 is smaller than the outside diameter of the insulative shield 126 at point 310. Thus, as the seals 116 are moving from the direction of the first fitting 122 towards the second fitting 124, the seals 116 translate from the insulative shield 126 of the first conductor 110 onto the contact socket 120 at point 130.

The outside diameter of the contact socket 120 then gradually increases from the point 310 to point 312 such that at the point 312 the outside diameter of the contact socket 120 is slightly greater than that of the insulative shield 126 of the second conductor 112. The result of this is that as the seals 116 translate along the contact socket 120 from the first fitting 122 to the second fitting 124, the seals will "drop" on to the insulative shield 126 of the second conductor 112 at the point 312. The seals 116 will then continue to translate along the insulative shield 126 of the second conductor 112 as dielectric fluid continues to be distributed into the space 118.

Figure 7:
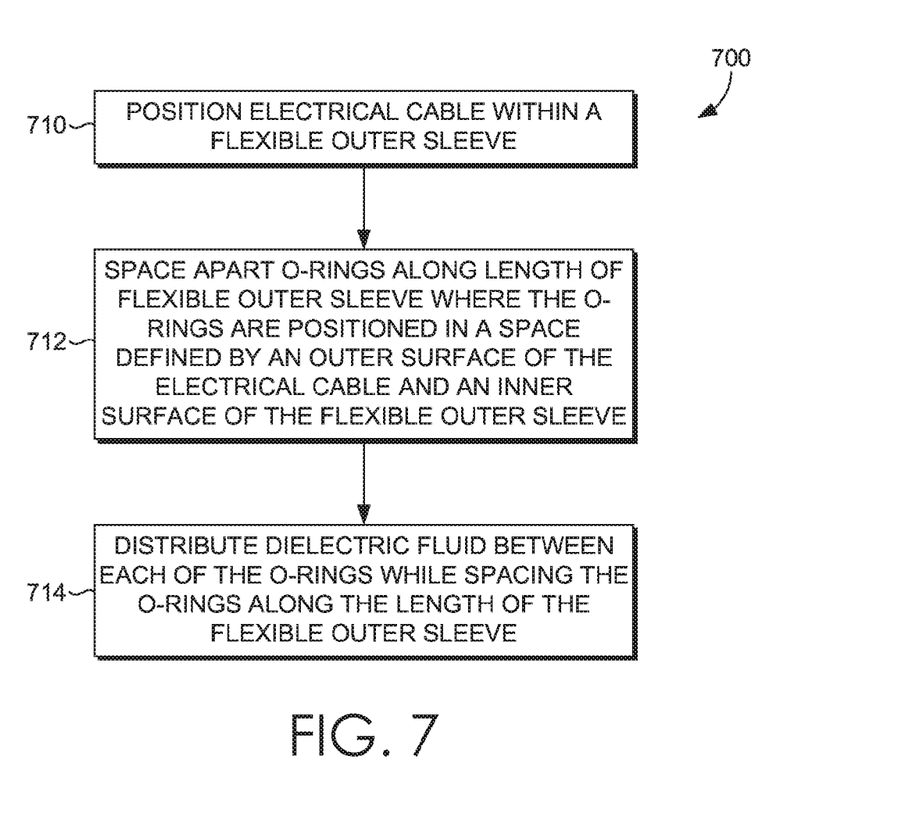
FIG. 7 is a flow diagram of an exemplary method of pressure-balancing a termination of a cable assembly in accordance with an aspect herein.

FIG. 7 illustrates a flow diagram of an exemplary method 700 of pressure balancing a termination of an electrical cable, such as the electrical cable 105 of the cable assembly 100. At a step 710, the electrical cable is positioned within a flexible sleeve such as the flexible sleeve 114 of the cable assembly 100. A space, such as the space 118, is thereby formed between the outer surface of the electrical cable and the inner surface of the flexible sleeve. At a step 712, a plurality of O-ring seals, such as the seals 116 of the cable assembly 100, are positioned in the space by spacing the seals apart along the length of the flexible sleeve. At a step 714, dielectric fluid is distributed between each of the O-ring seals as they are being spaced along the length of the flexible sleeve. Thus, each adjacent pair of O-ring seals delimits and seals a chamber containing dielectric fluid, such as the chambers 119 of the assembly 100.

Figure 9A:
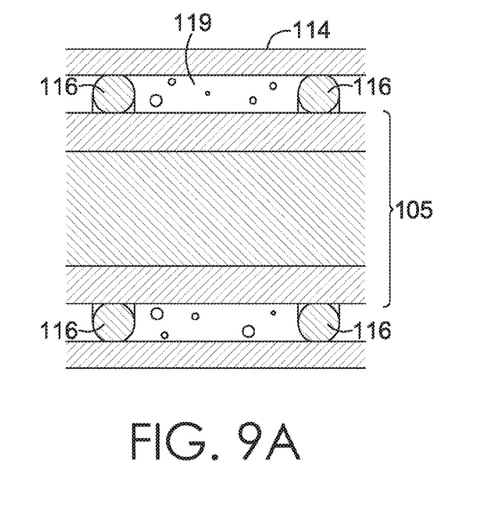
FIGS. 9A-9B depict a close-up view of a portion of a flexible, pressure-balanced cable assembly illustrating pressure-balancing characteristics of the assembly in accordance with aspects herein.
Figure 9B:
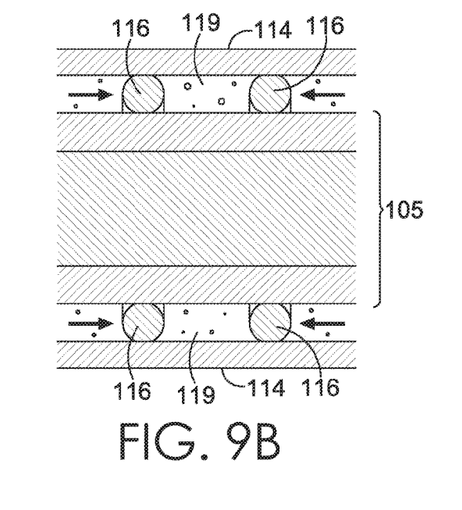

In operation, as shown in FIGS. 9A and 9B, the seals 116 translate along the inner surface of the flexible sleeve 114 and the outer surface of the electrical cable 105. More particularly, FIG. 9A depicts a chamber 119 formed between a pair of adjacent seals 116. The chamber 119 is filled with dielectric fluid as evidenced by the bubbles shown in FIG. 9A. Any change in pressure—whether positive or negative—in the external environment is transmitted to the interior of the cable assembly 100 via, for example, the fill port 220 of the first fitting 122 and/or via the port hole 418 of the second fitting 124. As shown in FIG. 9B, an increase in pressure in the external environment will cause air pockets or compressible elements within the dielectric fluid to contract in volume (as shown be the decrease in bubble size in FIG. 9B), allowing the seals 116 to move closer to one another as shown by the arrows. The seals 116 may return to their original position shown in FIG. 9A once the external pressure subsides. This is known as pressure-balancing.

Many different arrangements of the various components depicted, as well as components not shown, are possible without departing from the scope of the claims below. Aspects of our technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A flexible, pressure-balanced sleeve assembly for a cable termination, the sleeve assembly comprising:
   a flexible outer sleeve surrounding an electrical cable;
   a plurality of seals positioned between the flexible outer sleeve and the electrical cable;
   a plurality of chambers defined between each of the plurality of seals; and
   dielectric fluid contained within each of the plurality of chambers,
     wherein each of the plurality of seals is configured to travel along a section of a length of the electrical cable in response to differences between a pressure within a respective chamber and a pressure outside of the respective chamber.

2. The flexible, pressure-balanced sleeve assembly of claim 1, wherein the flexible outer sleeve comprises a non-electrically conductive plastic.

3. The flexible, pressure-balanced sleeve assembly of claim 1, wherein the electrical cable comprises an inner conductive core and an insulative layer positioned over the inner conductive core.

4. The flexible, pressure-balanced sleeve assembly of claim 1, wherein the plurality of seals comprises O-ring seals.

5. The flexible, pressure-balanced sleeve assembly of claim 4, wherein each of the plurality of seals is spaced apart from one another.

6. The flexible, pressure-balanced sleeve assembly of claim 1, further comprising:
   a first fitting surrounding the electrical cable and attached to a first end of the flexible outer sleeve; and
   a second fitting surrounding the electrical cable and attached to a second end of the flexible outer sleeve.

7. The flexible, pressure-balanced sleeve assembly of claim 6, wherein the first fitting comprises a fill port for distributing the dielectric fluid contained within each of the plurality of chambers.

8. The flexible, pressure-balanced sleeve assembly of claim 7, wherein the fill port is in communication with an environment external to the flexible, pressure-balanced sleeve assembly.

9. The flexible, pressure-balanced sleeve assembly of claim 8, wherein the second fitting comprises a port hole that is in communication with the environment external to the flexible, pressure-balanced sleeve assembly.

10. The flexible, pressure-balanced sleeve assembly of claim 1, wherein each of the plurality of seals is independently movable along the electrical cable.

11. A flexible, pressure-balanced electrical cable assembly comprising:
    an electrical cable;
    a flexible tubing positioned over the electrical cable and defining a space between an inner surface of the flexible tubing and an outer surface of the electrical cable;
    a plurality of O-ring seals positioned between the inner surface of the flexible tubing and the outer surface of the electrical cable,
    wherein the plurality of O-ring seals, in combination with the inner surface of the flexible tubing and the outer surface of the electrical cable, delimit a plurality of individual chambers in the space; and
    dielectric fluid contained within each of the individual chambers,
    wherein each of the plurality of O-ring seals is independently movable along the outer surface of the electrical cable in response to differences between a pressure within the flexible, pressure-balanced electrical cable assembly and a pressure outside of the assembly.

12. The flexible, pressure-balanced electrical cable assembly of claim 11, wherein the electrical cable comprises an inner conductive core and an insulative layer positioned over the inner conductive core.

13. The flexible, pressure-balanced electrical cable assembly of claim 12, wherein the flexible tubing comprises a non-electrically conductive plastic.

14. The flexible, pressure-balanced electrical cable assembly of claim 13, wherein the plurality of O-ring seals is positioned between the inner surface of the flexible tubing and an outer surface of the insulative layer of the electrical cable.

15. The flexible, pressure-balanced electrical cable assembly of claim 11, wherein each adjacent pair of O-ring seals delimits and seals a respective individual chamber.

16. The flexible, pressure-balanced electrical cable assembly of claim 11, wherein the electrical cable comprises at least a first conductor and a second conductor joined together via a contact socket.

17. The flexible, pressure-balanced electrical cable assembly of claim 16, wherein a first portion of the plurality of O-ring seals is positioned between the inner surface of the flexible tubing and the outer surface of the first conductor, and wherein a second portion of the plurality of O-ring seals is positioned between the inner surface of the flexible tubing and the outer surface of the second conductor.

18. The flexible, pressure-balanced electrical cable assembly of claim 11, further comprising a first fitting surrounding the electrical cable and attached to a first end of the flexible tubing, the first fitting comprising at least a fill port useable for distributing the dielectric fluid contained with each of the individual chambers, the fill port in communication with an external environment.

19. The flexible, pressure-balanced electrical cable assembly of claim 18 further comprising a second fitting surrounding the electrical cable and attached to a second end of the flexible tubing, the second fitting comprising at least a port hole in communication with the external environment.

20. A method of pressure-balancing a termination of an electrical cable, the method comprising:
positioning the electrical cable within a flexible outer sleeve, wherein a space is defined between an outer surface of the electrical cable and an inner surface of the flexible outer sleeve;
positioning a plurality of O-ring seals in the space, wherein positioning the plurality of O-ring seals comprises:
spacing apart each O-ring seal of the plurality of O-ring seals along a length of the flexible outer sleeve; and
distributing dielectric fluid between] each of the plurality of O-ring seals, wherein each adjacent pair of O-ring seals, in combination with the inner surface of the flexible outer sleeve and the outer surface of the electrical cable, delimits and seals an individual chamber containing the dielectric fluid.

21. The method of claim 20, wherein the electrical cable comprises at least a first conductor and a second conductor joined together via a contact socket.

* * * * *